Inventors:
WILLIAM I. BALLENTINE, JR.
and HARRY C. BREST,
by: Donald G. Dalton
their Attorney.

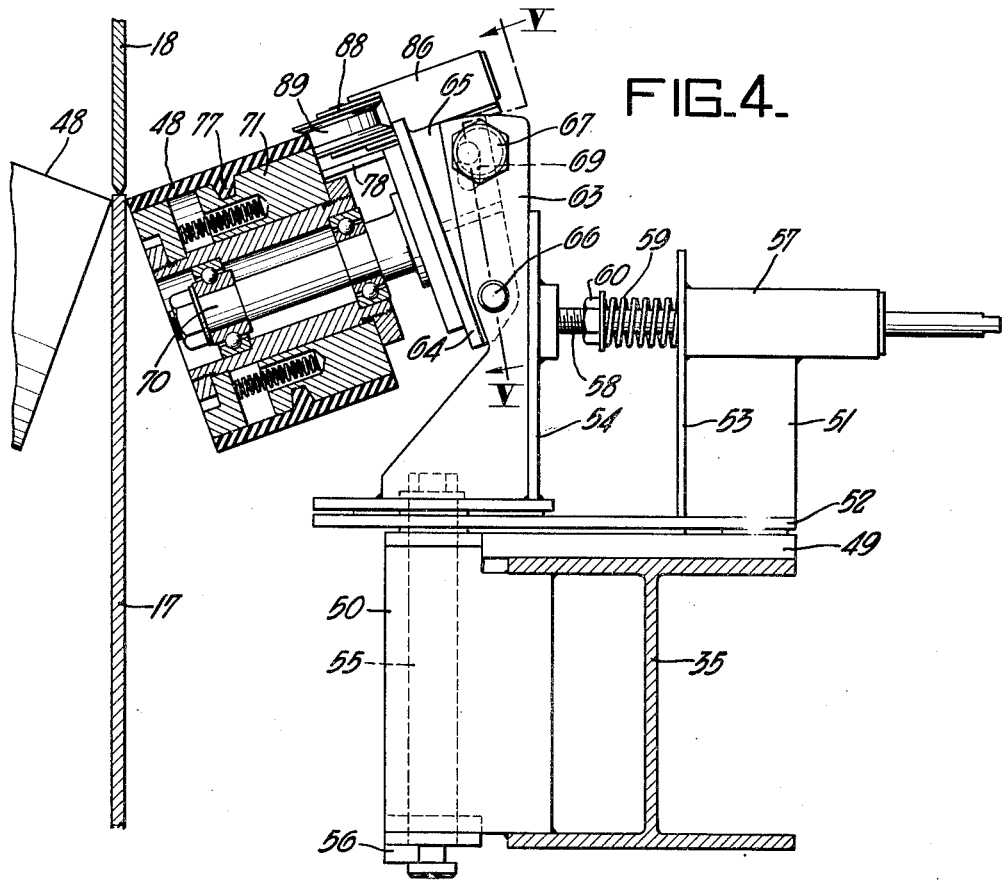

United States Patent Office
2,781,441
Patented Feb. 12, 1957

2,781,441

TRAVELING APPARATUS FOR WELDING HORIZONTAL JOINTS BETWEEN VERTICALLY DISPOSED PLATES

William I. Ballentine, Jr., Whittier, and Harry C. Brest, Pomona, Calif., assignors to United States Steel Corporation, a corporation of New Jersey Application September 25, 1953, Serial No. 382,426

15 Claims. (Cl. 219—126)

This invention relates to a traveling welding apparatus and, in particular, to apparatus adapted to ride on the upper edge of a plate disposed in a vertical plane, for progressively uniting the lower edge of the plate to a supporting plate therebelow which may be horizontal or vertical.

The construction of large cylindrical storage containers such as oil tanks by riveting has now been largely superseded by butt-welding metal plates end-to-end to form continuous rings, and building up one ring on another by welding the abutting edges of successive rings. It is accordingly the object of our invention to provide apparatus for performing the second of these steps efficiently, rapidly and continuously by submerged arc welding. More particularly, it is the object of our invention to provide an automotive welder suspended from supporting wheels and guided by stabilizing rollers engaging the plates, equipped with automatic arc-welding heads and means for supporting a flux blanket on both sides of the seam at the point of weld.

In a present preferred embodiment, our invention comprises a main frame having flanged wheels adapted to roll on the upper edge of a tank-wall plate standing on edge. A pair of tubular posts depending from each end of the frame straddle the plate. The posts on each side of the frame are connected by cross bracing and accommodate screws telescoping into the lower ends thereof. A horizontal beam extending between the lower ends of the screws on each side of the apparatus carries an automatic arc-welding head and shelf means adapted to support a layer of flux against the seam to be welded. We provide means for actuating the screws to adjust the welding heads vertically and means for adjustably mounting the flux-supporting shelf means on the beam. An operator's cage and platform are suspended from the main frame.

A complete understanding of the invention may be obtained from the following detailed description and explanation which refer to the accompanying drawings illustrating the present preferred embodiment. In the drawings, Figure 1 is an end elevation of our welder showing the plates being welded in section;

Figure 4 is a view partly in transverse section taken along the plane of line IV—IV of Figure 3 and partly in elevation;

Figure 5 is a sectional elevation taken on line V—V of Figure 4;

Figures 6 and 7 are sections taken, respectively, on the planes of lines VI—VI and VII—VII of Figure 5; and Figure 8 is a vertical section through one of the tubular posts showing the screw therein in elevation.

Figure 1:
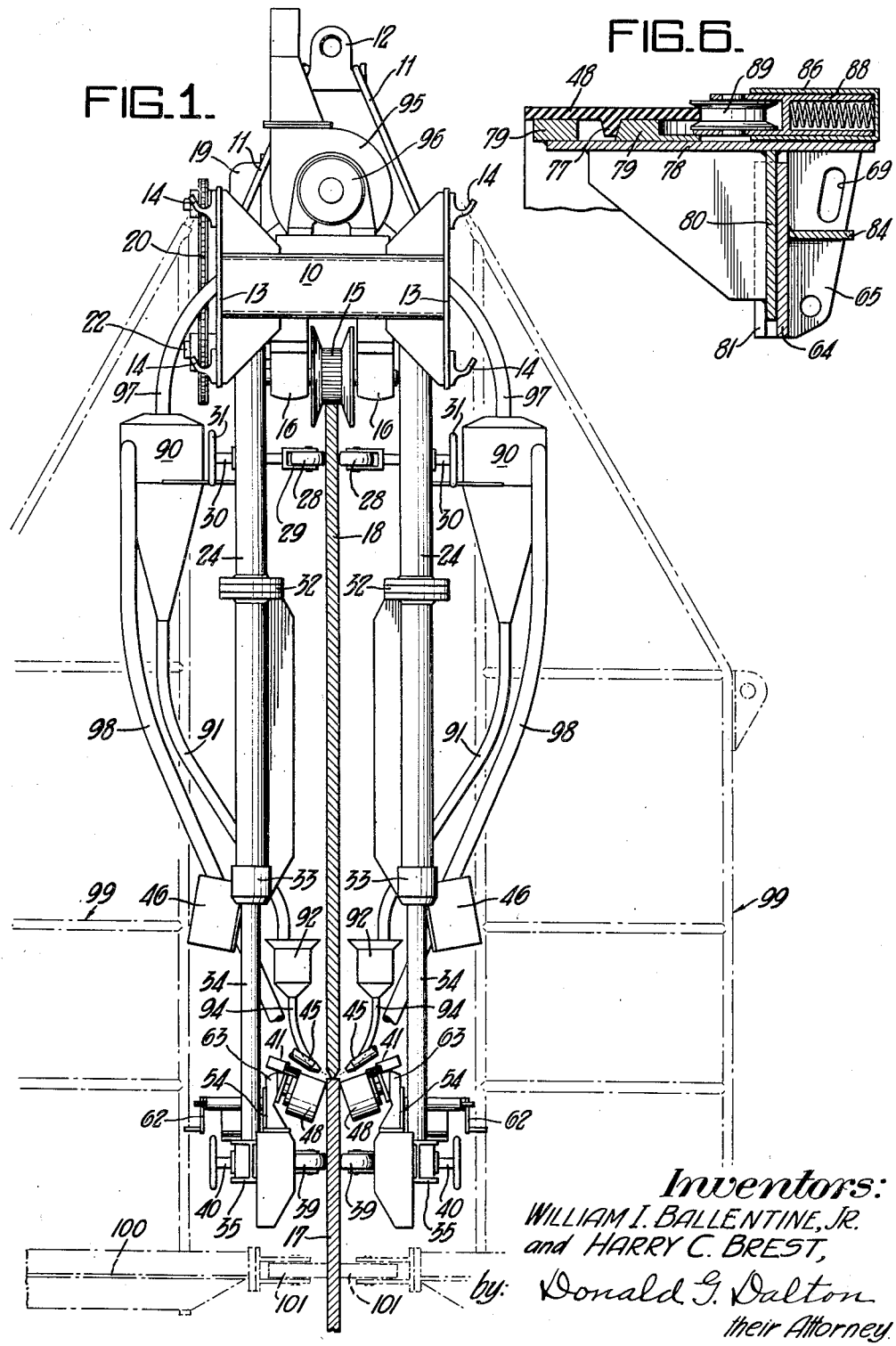
Figure 2:
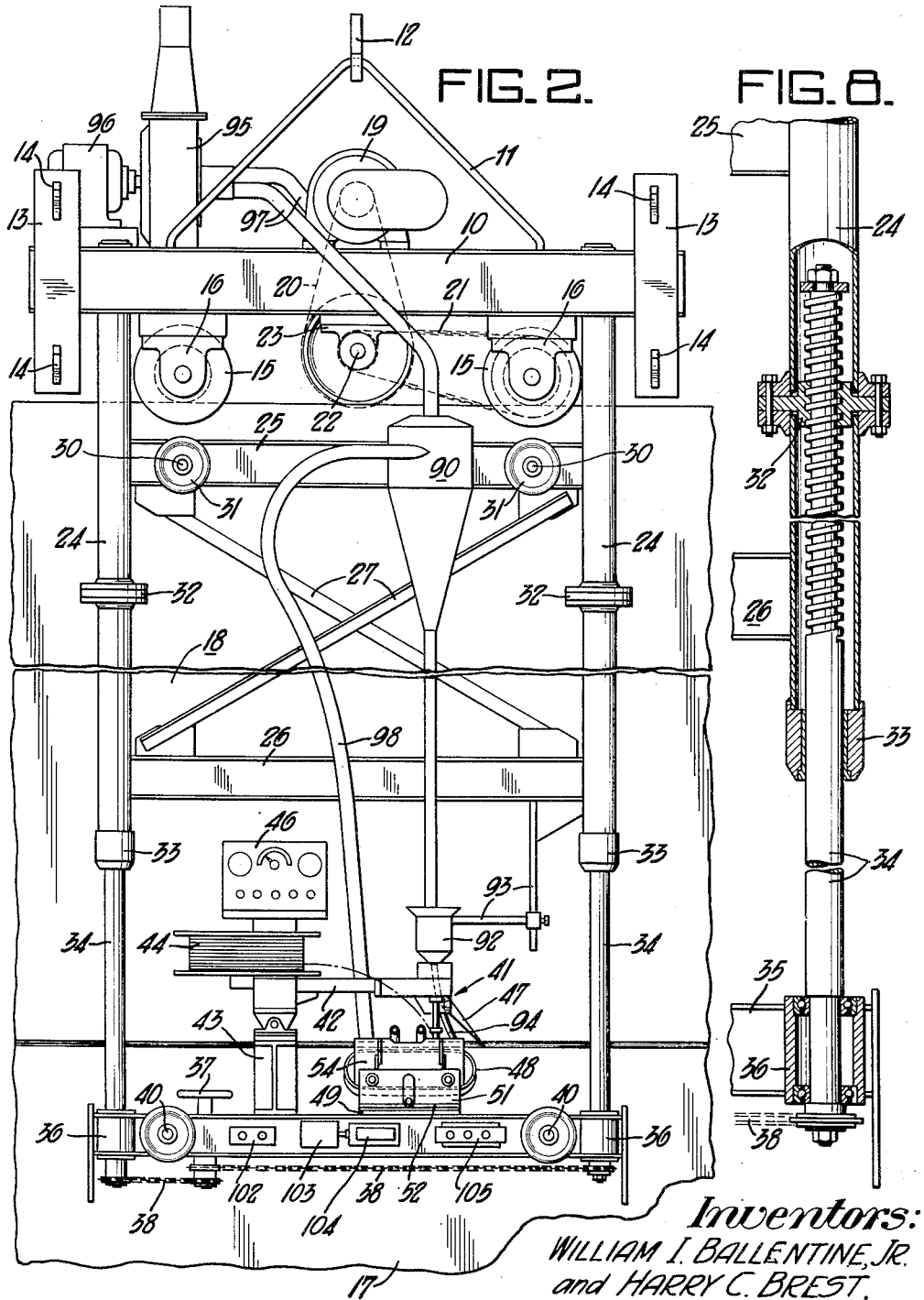
Figure 2 is a side elevation thereof with parts omitted for clearness.

Referring now in detail to the drawings and, for the present, to Figures 1 and 2, our welder is mounted on an elongated main frame 10 of box section, fabricated from steel plates. Lifting bails 11 extend upwardly and inwardly from each side of the frame and are connected by an eye-plate 12. A pair of brackets 13 having hooks 14 secured thereto are fixed to the frame on both sides and at both ends. Flanged supporting wheels 15 are journaled in bearings 16 mounted on the bottom of the frame and are adapted to roll on the upper edge of the upper one of two tank-wall plates 17 and 18 disposed vertically one on the other. The shaft on which one of the wheels is mounted is driven by a gear motor 19 mounted on frame 10, through chain-and-sprocket drives 20 and 21. Intermediate driven and driving sprockets of the two drives are mounted on a common shaft 22 journaled in bearings 23 on the bottom of the frame. The tread of the driving wheel 15 is knurled to afford good traction.

A tubular post 24 depends from each corner of frame 10 and the two pairs of posts on opposite ends of the frame straddle plate 18. The posts of each pair on one side are connected by vertically spaced horizontal beams 25 and 26 and diagonal braces 27 join opposite ends of the two beams. Upper frame-stabilizing caster rollers 28 are journaled in yokes 29 carried by horizontal screw shafts 30. The shafts are adjustable transversely through the beams 25 by hand wheels 31.

Each post 24 incorporates a flanged nut 32 intermediate the length thereof and has a bearing 33 at its lower end. A vertical adjusting screw shaft 34 is telescoped into each post, being journaled in the lower bearing and threaded through the nut thereof. The pair of screw shafts on each side of the frame 10 are connected by a bottom horizontal beam 35 having bearing sleeves 36 set into each end thereof accommodating bearings in which the lower ends of the screws are journaled. The screw shafts of each pair may be turned in either direction, to the same extent, by a handwheel 37 on a shaft journaled vertically in beam 35 and chain-and-sprocket drives 38, to raise or lower the beam relative to the frame. Beam 35 is provided with lower stabilizing rollers 39 mounted on screw shafts 40, similar to rollers 28 and shafts 30.

Each beam 35 carries an automatic arc-welding head 41 of known construction. The head is mounted on an arm 42 adjustably secured to a block 43 on the beam. Each welding head operates in a known manner to draw electrode wire from a coil 44 carried on arm 42 and discharge it through a nozzle 45 as the electrode metal is fused by the arm and deposited in the seam between the plates 17 and 18 forming a welded joint uniting them. Electric current is supplied to the electrode from a separate generator in the known manner and may be adjusted by suitable control devices mounted in a case 46 mounted on a bracket upstanding from arm 42. Further details of the construction and operation of the welding heads are unnecessary since such devices are well known and commercially available.

A guiding finger 47 extending downwardly and inwardly from each head 41, tracks in the seam ahead of the point of weld and thereby maintains the head in proper cooperative relation therewith.

Figure 3:
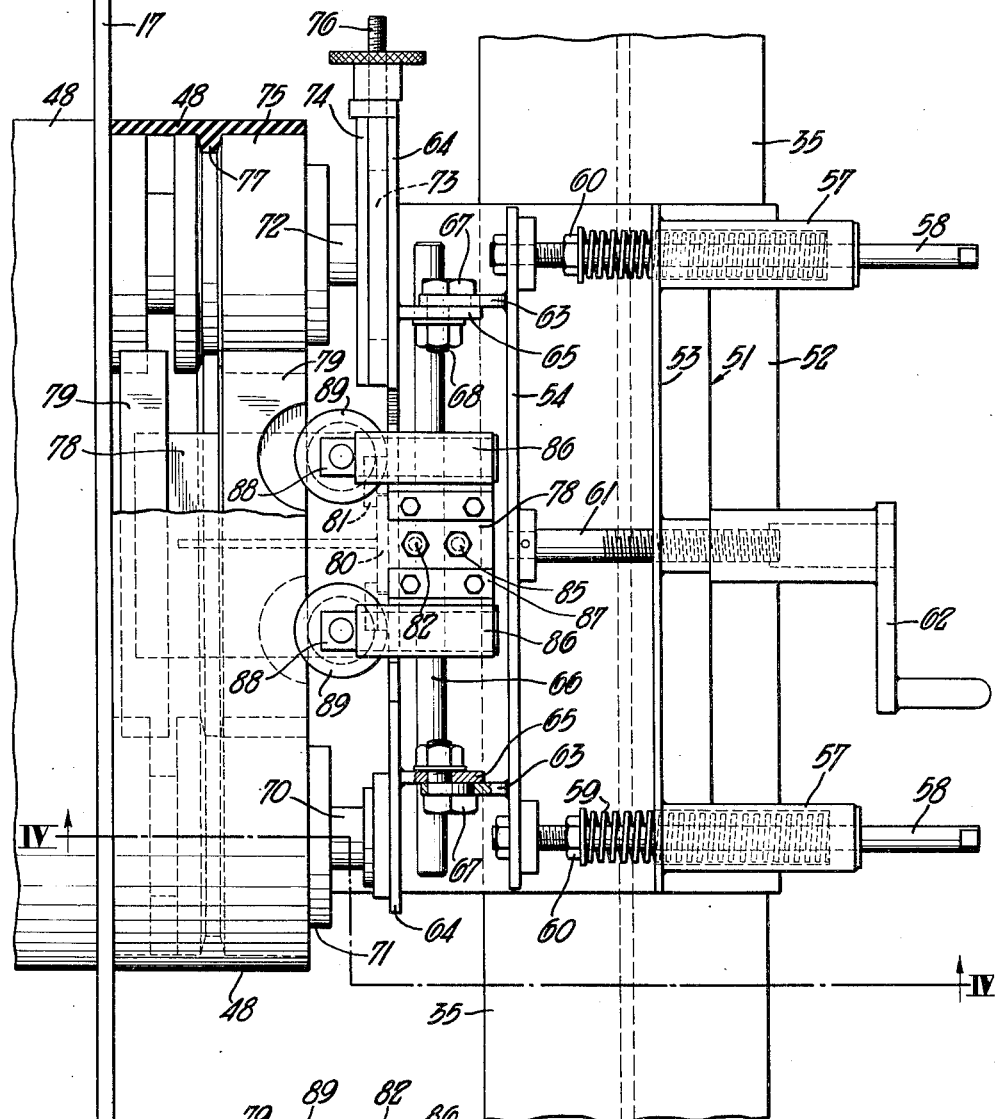
Figure 3 is a plan view of the flux-supporting shelves and the means for adjusting them, with parts broken away and in section.

Flux-supporting shelves in the form of belts 48 of asbestos impregnated with rubber-like material are mounted on beams 35 by means illustrated in detail in Figures 3 and 4. Referring now to the latter and first to Figure 4, a filler plate 49 and an auxiliary block 50 are secured to each beam 35. A frame 51 including a base 52 and a vertical web 53 parallel to beam 35 is angularly movable on plate 49. A carriage 54 of angle section has one flange slidable transversely on base 52, said flange being slotted and said base having a hole to accommodate a clamping pivot pin 55 secured to base 52 and extending through the slot in the flange and a hole in block 50. Pin 55 is held in position by a pivoted keeper plate 56 slotted for cooperation with a circumferential groove near the lower end of the pin. Carriage 54 is held in position on pin 55 by a cap screw threaded into the upper end thereof. The pivotal mounting of frame 51 permits it to adjust itself angularly as necessary to follow the contour of the seam being welded.

Tubular sockets 57 extending outwardly from web 53 slidably receive guide rods 58 secured to the vertical flange of carriage 54. Springs 59 on the rods fit loosely in the sockets and are compressed between the outer end of the latter and adjusting nuts 60 screwed on the rods against their inner ends. The springs urge carriage 54 toward plate 17 until the latter is engaged by belt 48. The entire carriage 54 may be retracted against the force of the springs by means of a screw shaft 61 extending outwardly therefrom through a bearing in web 53. A crank 62 has a hub tapped for cooperation with the outer end of the screw shaft. When the crank is backed off on the shaft, the springs 59 immediately push the carriage toward plate 18.

The vertical flange of carriage 54 has spaced vertical wings 63 extending inwardly normal thereto (see Figure 3). A tilting shaft-mounting plate 64 normally inclined to the vertical has wings 65 lapping wings 63 of the carriage and is pivoted thereto on a shaft 66. Bolts 67 extending through holes in wings 63 have threaded eccentric inner ends 68 passing through slots 69 in wings 65. Clamping nuts on the ends 68 hold plate 64 at a predetermined angle to the vertical but this angle may be changed by backing off the nuts, turning both bolts 67 in the same direction and to the same extent and then turning the nuts home tight. In Figure 3, plate 64 is shown in vertical position for ease of illustration.

A shaft 70 is fixed to plate 64, normal thereto, adjacent one end thereof, and a pulley 71 is journaled thereon on antifriction bearings. A similar shaft 72 is secured to a block 73 at the other end of plate 64 slidable between spaced ways 74, and has a pulley 75 thereon. Adjustment of shaft 72 toward and from shaft 70 for belt tightening may be effected by means of a screw 76 secured to block 73 and extending longitudinally therefrom with a knurled thumb nut on the outer end thereof. The pulleys have circumferential grooves therein of trough-shaped section and belts 48 have a continuous rib 77 of similar section on their inner face. This prevents the belts from being shifted axially of the pulleys.

Figure 7:
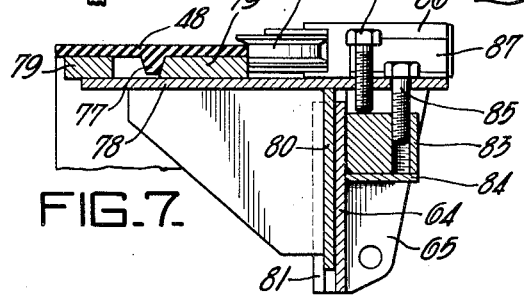

We provide a shoe for supporting the upper run of belts 48 and means for adjusting the shoe vertically. As shown in Figures 5 through 7, a plate 78 having spaced shoe members 79 thereon is carried on a slide 80 extending downwardly therefrom between ways 81 secured to tilting plate 64. The upper run of each belt slides on shoe members 79. A screw 82 for adjusting the plate 78 is threaded therethrough and bears on a block 83 carried by a web plate 84 extending between wings 65. A clamp screw 85 extends through plate 78 and into a tapped hole in the block. Upward adjustment of plate 78 raises shoe members 79 to lift the mid-portion of the upper run of each belt as shown in dotted lines in Figure 5. This causes the flux delivered to the belts ahead of the points of weld to pile up at such points thus effecting better shielding of the arc.

Spaced spring boxes 86 are secured to plate 78 normal to plate 64 by angle brackets 87. Spring-loaded plungers 88 reciprocable in boxes 86 have flanged back-up rollers 89 journaled therein adapted to engage the outer edge of the upper run of each belt 48 to urge them into contact with the plates being welded. The outer shoe portion 79 has cut-outs as shown in Figures 3 and 6 to permit limited inward movement of the rollers.

Welding flux is supplied to belts 48 continuously and removed therefrom by means shown in Figures 1 and 2. A main flux hopper 90 is located on each side of the welder being mounted on a bracket extending outwardly from beam 25. The hoppers 90 are in the form of cyclone separators each having a bottom outlet from which a supply tube 91 extends to a funnel 92 carried on clamp rods 93 from beam 26. A nozzle tube 94 extends from each funnel 92 to a point above one of the belts 48 and ahead of the point of weld. A suction fan 95 is mounted with its driving motor 96 on frame 10. Suction pipes 97 extend from the fan to the top or air-exhaust outlets of hoppers 90. A suction hose 98 extends upwardly from each belt 48 behind the point of weld to the tangential inlet of the hopper 90 to pick up loose flux for re-use.

An operator's cage 99 fabricated from pipe is adapted to be hung on hooks 14 of frame 10 and is provided with a floor 100 at a level such that an operator standing thereon is in a convenient position to observe and control the operation of the apparatus and inspect the weld produced thereby. The cage is fitted with steadying rollers 101 at floor level, bearing against the side of plate 17.

In using the apparatus, a series of plates 18 adapted to form a portion of a tank wall, is set up in a closed ring on a previously fabricated ring of plates 17 (or on the floor or bottom of the tank) and tack welded together and to the latter. The apparatus of our invention is then lifted by a crane and set in place with wheels 15 riding on the upper edge of the plates of the upper ring and with the depending posts 24 and their connecting beams 25, 26 and 35 straddling plate 18 as shown in Figure 1. The apparatus is then driven to travel around the wall and the automatic arc-welding heads are operated to form a continuous deposit weld uniting plates 17 and 18 around the entire circumference of the rings formed thereby. In this way, successive rings of plates may be erected one on the other until the tank wall has been built up to the desired height.

To facilitate the operation of the apparatus, the necessary controls are mounted on beam 35 within easy reach of the operator. A speed-control switch 102 governs driving motor 19 and a tachometer 103 indicates the motor speed. A switch 104 controls fan motor 96 and an on-off switch 105 controls the welding-current supply.

It will be apparent from the foregoing description and explanation that the apparatus of our invention is characterized by numerous advantages some of which have already been mentioned. The screws 34 supporting the beam 35 on which the welding heads are mounted, permit the latter to be adjusted vertically to the exact level of the seam to be welded. The entire thread length of the screws, furthermore, is protected from dust and other flying particles. The pivotal mounting of the frame 51 carrying the flux belts 48 permits continuous self adjustment thereof. The slidable mounting of the carriage 54 and springs 59 makes it possible to bring the belts into proper contact with the work merely by turning crank 62. The angle the belts make with the horizontal may be adjusted by turning bolts 67. The belt-engaging shoe members 79 may be adjusted upwardly and downwardly to cause the belt to conform to the contour of the curved plates being welded. Back-up rollers 89 force the inner belt edges into firm engagement with the tank-wall plates. The belts and pulleys may easily be removed bodily from the apparatus by withdrawing pivot pins 66, thus freeing the shaft-mounting plates 64 from carriages 54. The knurled treads of the frame-supporting wheels 15 insure positive traction on the upper edge of the ring of plates being welded. The ribs on the inner surfaces of belts 48 prevent the latter from shifting along the faces of the pulleys.

Although we have disclosed herein the preferred embodiment of our invention, we intend to cover as well any changes or modifications therein which may be made without departing from the spirit and scope of the invention.

We claim:

1. Apparatus for holding flux in contact with a horizontal seam between vertically disposed plate edges, comprising a frame, a carriage slidable on said frame toward and from the plate edges being welded, a tilting plate pivoted on said carriage on an axis parallel to said seam and shelf means mounted on said tilting plate adapted to engage the side of one of the plates being welded.

2. The apparatus defined by claim 1 characterized by means mounting said frame for pivotal movement on a vertical axis adjacent said edges.

3. The apparatus defined by claim 1 characterized by spring means on said frame constantly urging said carriage toward the plate edges being welded.

4. The apparatus defined by claim 1 characterized by manually operable means for retracting said carriage.

5. The apparatus defined by claim 1 characterized by said carriage having a vertical wall, sockets on said frame normal to said wall and compression springs in said sockets urging the carriage toward the plates being welded.

6. The apparatus defined by claim 5 characterized by guide rods extending outwardly normal to said wall through said springs and sockets.

7. The apparatus defined by claim 5 characterized by a screw extending outwardly from said wall and a crank carried by said frame cooperating with said screw to retract the carriage.

8. The apparatus defined by claim 1 characterized by said carriage and tilting plate having lapping wing portions and bolts with eccentric ends extending through said portions for adjusting the angularity of the tilting plate.

9. The apparatus defined by claim 1 characterized by spaced shafts extending inwardly from said tilting plate normal thereto, pulleys journaled on said shafts and a belt trained about said pulleys adapted to make edgewise engagement with the plate edges being welded.

10. The apparatus defined by claim 13 characterized by screw means for adjusting said shoe plate upwardly and downwardly.

11. Apparatus for welding a seam uniting two plates standing vertically one on the other, comprising a frame having spaced wheels adapted to ride on the upper edge of the upper plate, a pair of posts depending from said frame on one side of the plates, screw shafts telescoping into said posts, a beam extending between and carried by said shafts, driving means common to said shafts and a welding head mounted on said beam adapted to form said beam as said frame is moved along said upper edge.

12. The apparatus defined by claim 11 characterized by stabilizing rollers mounted on said beam engaging the lower plate, a beam extending between said posts, and stabilizing rollers mounted on said last-mentioned beam engaging said upper plate.

13. Apparatus for holding flux in contact with a horizontal seam between vertically disposed plate edges comprising a shaft-mounting plate disposed adjacent said seam, spaced shafts extending from said plate, normal thereto, pulleys on said shafts, a belt trained around said pulleys, a shoe plate carried by said shaft-mounting plate, extending between said pulleys and adapted to be slidably engaged by the upper run of said belt, a slide extending downwardly from said shoe plate and ways on said shaft-mounting plate guiding upward and downward movement of said slide.

14. Apparatus for welding a seam uniting two plates disposed vertically in edgewise abutment, one standing on the other, comprising a frame disposed horizontally having wheels spaced therealong adapted to ride on the upper edge of the upper plate, a pair of posts spaced along said frame and depending therefrom on one side of the upper plate, a motor on said frame, driving means connecting the motor to one of said wheels, screw shafts telescoping into said posts, a chain-and-sprocket drive common to said shafts, a beam extending between and carried by said shafts and an arc-welding head on said beam adapted to deposit a seam of weld metal along said abutting plate edges continuously as said motor drives the frame along the upper edge of the upper plate.

15. The apparatus defined by claim 11 characterized by said shafts being threaded, nuts fixed in said posts into which said shafts are screwed, and bearings on said beam in which the lower ends of said shafts are journaled.

References Cited in the file of this patent

UNITED STATES PATENTS

| | | |
|---|---|---|
| 1,491,902 | Cable | Apr. 29, 1924 |
| 1,821,410 | Taylor | Sept. 1, 1931 |
| 2,269,538 | Lewbers | Jan. 13, 1942 |
| 2,529,812 | Peters | Nov. 14, 1950 |
| 2,638,524 | Meyer | May 12, 1953 |
| 2,698,891 | Meyer | Jan. 4, 1955 |